(12) United States Patent
Kaylor et al.

(10) Patent No.: US 6,481,278 B1
(45) Date of Patent: Nov. 19, 2002

(54) HALL-EFFECT FINE RESOLUTION LIQUID LEVEL INDICATOR

(75) Inventors: Stephen Kaylor, Pompano Beach, FL (US); Duane Samuelson, Boca Raton, FL (US); Gordon Yowell, Boca Raton, FL (US); Alvin Seymour Blum, Fort Lauderdale, FL (US)

(73) Assignee: Predator Systems, Inc., Boca Raton, FL (US)

( * ) Notice: Subject to any disclaimer, the term of this patent is extended or adjusted under 35 U.S.C. 154(b) by 0 days.

(21) Appl. No.: 09/776,877

(22) Filed: Feb. 6, 2001

(51) Int. Cl.[7] .................. G01F 23/30; G01F 23/36; G08B 21/00; H01H 35/18
(52) U.S. Cl. .............. 73/313; 73/314; 73/308; 340/618; 340/623; 340/624; 200/84 C
(58) Field of Search ............ 73/308, 313, 314, 73/DIG. 3; 340/624, 618, 623; 338/33, 32 H; 200/84 C

(56) References Cited

U.S. PATENT DOCUMENTS

| | | | |
|---|---|---|---|
| 4,361,835 A | 11/1982 | Nagy | |
| 4,466,284 A | 8/1984 | Dumery | |
| 4,589,282 A | 5/1986 | Dumery | |
| 4,730,491 A | * 3/1988 | Lew | ............... 73/308 |
| 4,804,944 A | 2/1989 | Golladay | |
| 4,976,146 A | * 12/1990 | Senghaas et al. | ............. 73/313 |
| 5,347,864 A | 9/1994 | Songhass | |
| 5,565,687 A | 10/1996 | Berrill | |
| 5,636,548 A | 6/1997 | Dunn | |

* cited by examiner

Primary Examiner—Hezron Williams
Assistant Examiner—Katrina Wilson
(74) Attorney, Agent, or Firm—Alvin S. Blum

(57) ABSTRACT

A liquid level indicator apparatus provides direct readout of liquid level at high resolution using an array of vertically disposed Hall-effect magnetic switches. To overcome the limit to closer spacing of the switches imposed by their vertical dimension, they a disposed side by side horizontally and vertically by a distance less than the vertical dimension of each switch. They are mounted on a flat flexible substrate and then bent around into a hollow cylinder or prism shape. A floating magnet of annular shape surrounds the cylinder, or a magnet corresponding to the cylindrical or prismatic shape floats inside the surrounding circuit board. Several circuits are shown for displaying a liquid level readout resulting from the actuation of the switches by the magnet.

14 Claims, 3 Drawing Sheets

HALL-EFFECT FINE RESOLUTION LIQUID LEVEL INDICATOR

BACKGROUND OF THE INVENTION

This invention relates to float actuated liquid level indicators, and more particularly to such indicators employing a string of many Hall-effect switches actuated by a floating permanent magnet.

DESCRIPTION OF THE PRIOR ART

It is well known to indicate liquid level by a floating permanent magnet actuating one or more of a plurality of Hall-effect switches disposed in a vertical array. U.S. Pat. No. 5,565,687 issued Oct. 15, 1996 to Berrill reviews the prior art. He discloses a linear series of Hall-effect switches disposed in a plurality of linear vertical arrays in discrete probes which are butted end to end. In each array a resistance chain is linked at intervals to the switches. Movement of the floating magnet adjacent the array thereby gives a progressively changing voltage on an output line from the resistance chain. When the magnet moves from one array to the succeeding array, after generating a maximum signal, that signal is maintained by a latch. A cumulative signal from the series of latches can then be generated. The arrays are powered separately in parallel so that the length can be extended as desired by additional arrays. The object is to reduce error due to noise over useful signal as the number of switches is increased to increase resolution and/or the length of the device. For liquid level indicators encircled by a floating magnet a practical problem with increasing resolution for a fixed length of indicator is the actual physical dimensions of the switches. If the minor dimension of the switch is, for example, 5 mm, then at most only 100 switches may be disposed in a vertical array for a tank with a 50 cm depth. This limits resolution to 1% of the volume. It would be useful to be able to obtain finer resolution with vertical arrays of switches. As the actual cost of these switches is steadily diminishing, the use of increasing numbers of switches would be a viable alternative if there were a way of overcoming the problem of geometry.

SUMMARY OF THE INVENTION

It is accordingly an object of the invention to provide a liquid level indicator that employs a floating magnet actuating a vertical array of Hall-effect switches in which the number of switches in that array can be greater than that dictated by the vertical dimension of the switch. This is achieved in the instant invention by positioning each switch beside its preceding and succeeding switches and spaced apart vertically therefrom by less than the vertical dimension. The switch array is then wrapped around into a closed cylinder or similar configuration to form a stair step or helical array of the switches. The floating magnet is arranged to provide equal magnetic effect on all of the switches as it rises and falls. This may be achieved by an encircling annular magnet, for example, or by a magnet floating within the cylinder. Various means are provided to reduce the effect of signal noise.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
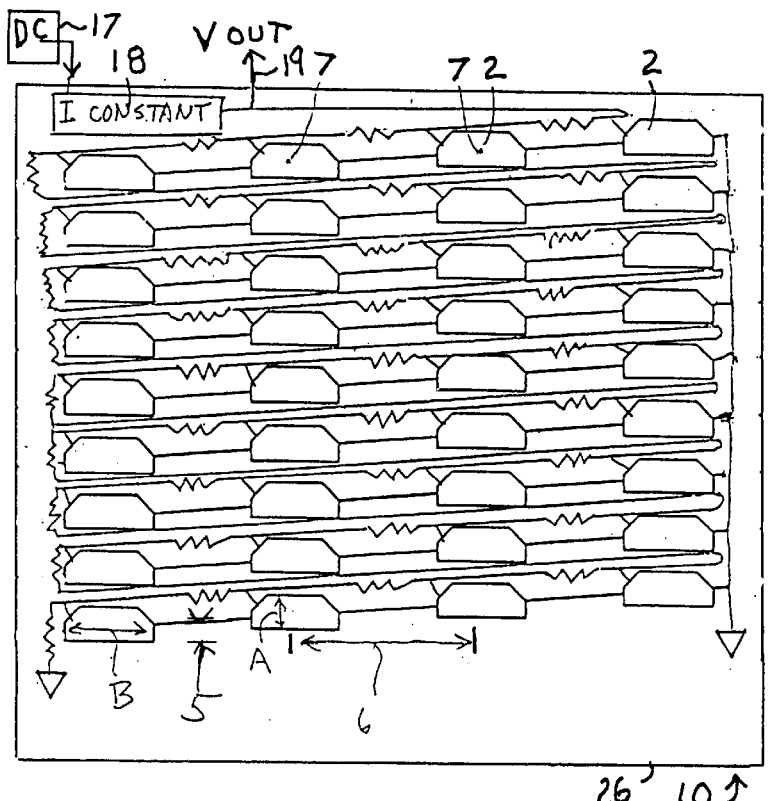
FIG. 1 is a diagrammatic front elevation of the circuit board of the invention in planar configuration.
Figure 3:
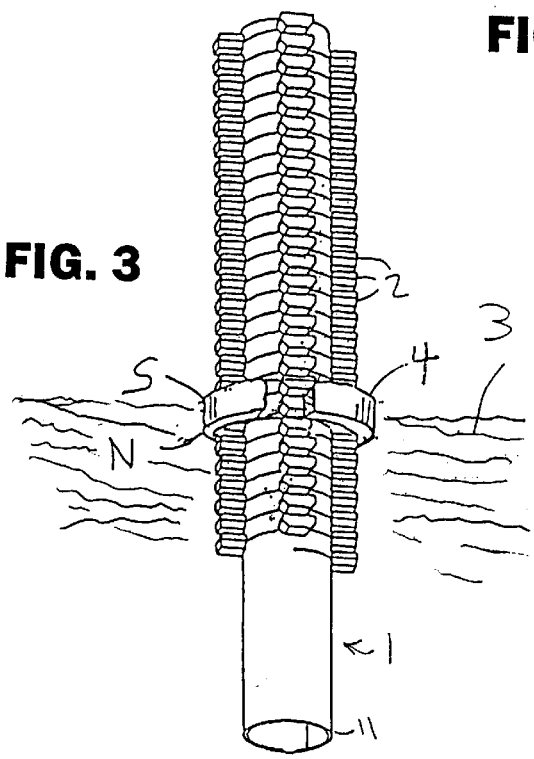
FIG. 3 is a perspective view of the cylinder of FIG. 2 with a floating annular magnet in place.
Figure 2:
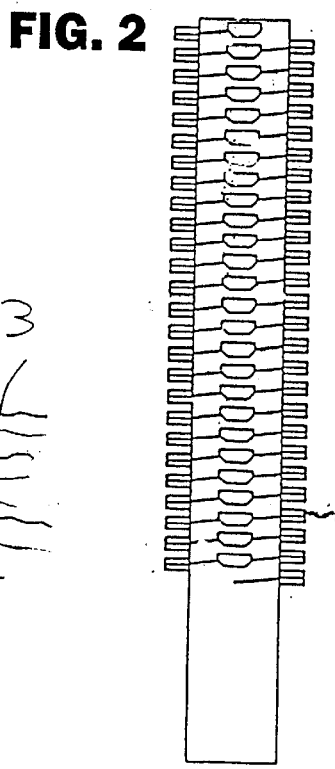
FIG. 2 is a diagrammatic front elevation of the circuit board of FIG. 1 rolled into a cylinder.

Referring now first to FIGS. 1–4, the fine resolution liquid level indicator apparatus 1 of the invention comprises a plurality of Hall-effect magnetic sensor switches 2, well known in the art, that close in the presence of a certain magnetic field. Current switches of this type are becoming very low in cost and easy to install on a circuit board. The switches 2 are mounted on a flexible substrate 26, well known in the art, in the planar configuration. After the circuit board is completely assembled, it is then bent around and secured in the form of a cylinder 11 with the switches on the outside of the cylinder. An annular magnet 4 has a controlled density to cause it to float on the liquid 3 whose level is to be determined. It is closely applied to the switches, and substantially uniformly spaced therefrom, to apply its magnetic field uniformly as it rises and falls with the liquid. The switch modules 2 have a vertical dimension A and a horizontal dimension B. If the modules 2 were simply disposed one atop the other, they could provide a resolution that would be limited by this dimension A. The invention provides for increasing the resolution over this limit by spacing the modules with their center points 7 spaced apart horizontally by a distance 6 that is at least the dimension B and vertically by a distance 5 that is less than the dimension A. In order to provide for uniform exposure to the magnet, the circuit board is bent around into a cylinder, and an encircling annular magnet 4 is provided.

The circuit comprises a DC power source 17 that may be line fed, or battery power, connected to a constant current module 18 well known in the art. The constant current is applied to a grounded series string of closely matched resistors 15 that have a very low temperature coefficient. The switches 2 are connected between the resistors so as to ground the connection point at the liquid level where the switch 2 is closed. This reduces the total resistance of the remaining string. The constant current module responds by reducing the voltage applied to the remaining resistors in the string to keep current constant. The voltage output signal 19 is the voltage applied to the string 14. This output signal is displayed in a suitable form such as a digital display 20, for example.

Figure 5:
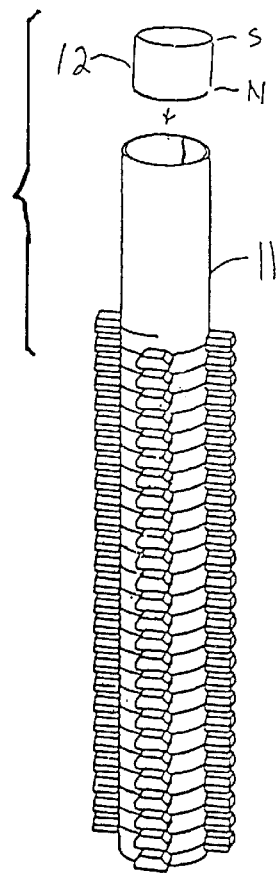
FIG. 5 is a perspective view as in FIG. 3 with a magnet that floats inside the cylinder.

Referring now to FIG. 5, another embodiment of the invention is shown in which the magnet 12 floats inside the cylinder 11.

Figure 6:
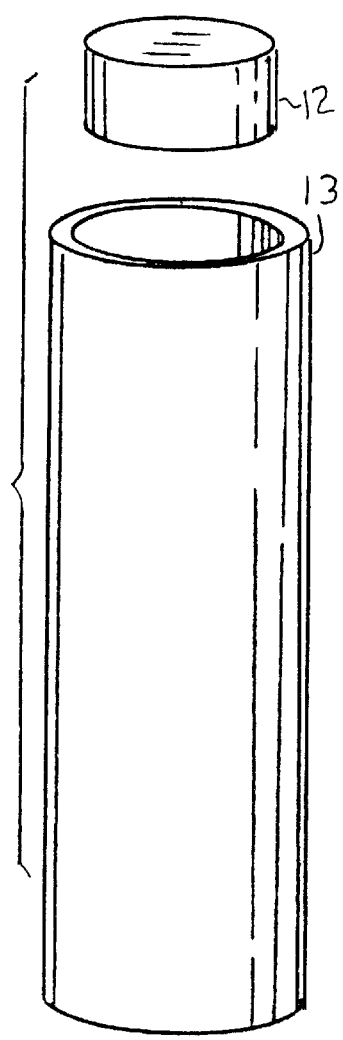
FIG. 6 is a view as in FIG. 5 with the components inside the cylinder.

Referring now to FIG. 6, another embodiment of the invention is shown in which the magnet 12 floats inside a cylinder 13 having the switches on the inside of the cylinder.

Figure 8:
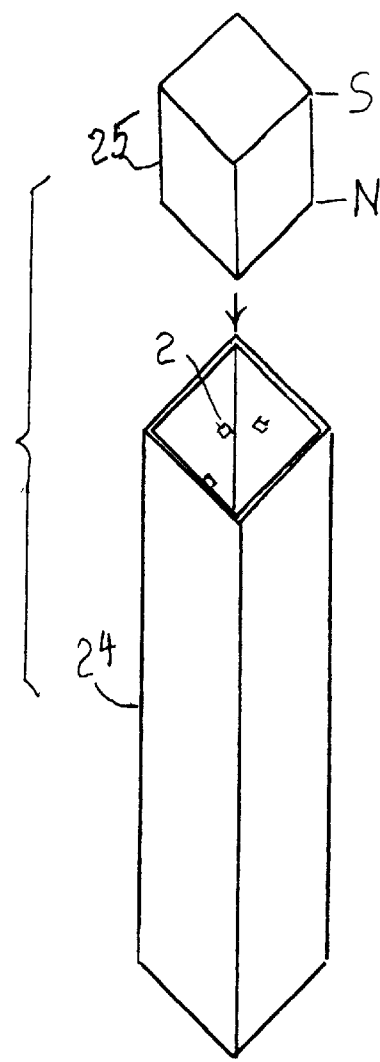
FIG. 8 is a perspective view of another embodiment of the invention.

Referring now to FIG. 8, another embodiment of the invention is shown in which the board is bent into a four-sided prism 24 with the switches 2 on the inside. A four-sided prismatic magnet 25 floats inside the hollow prism. The board may take other final shapes as desired.

Figures 4, 7:
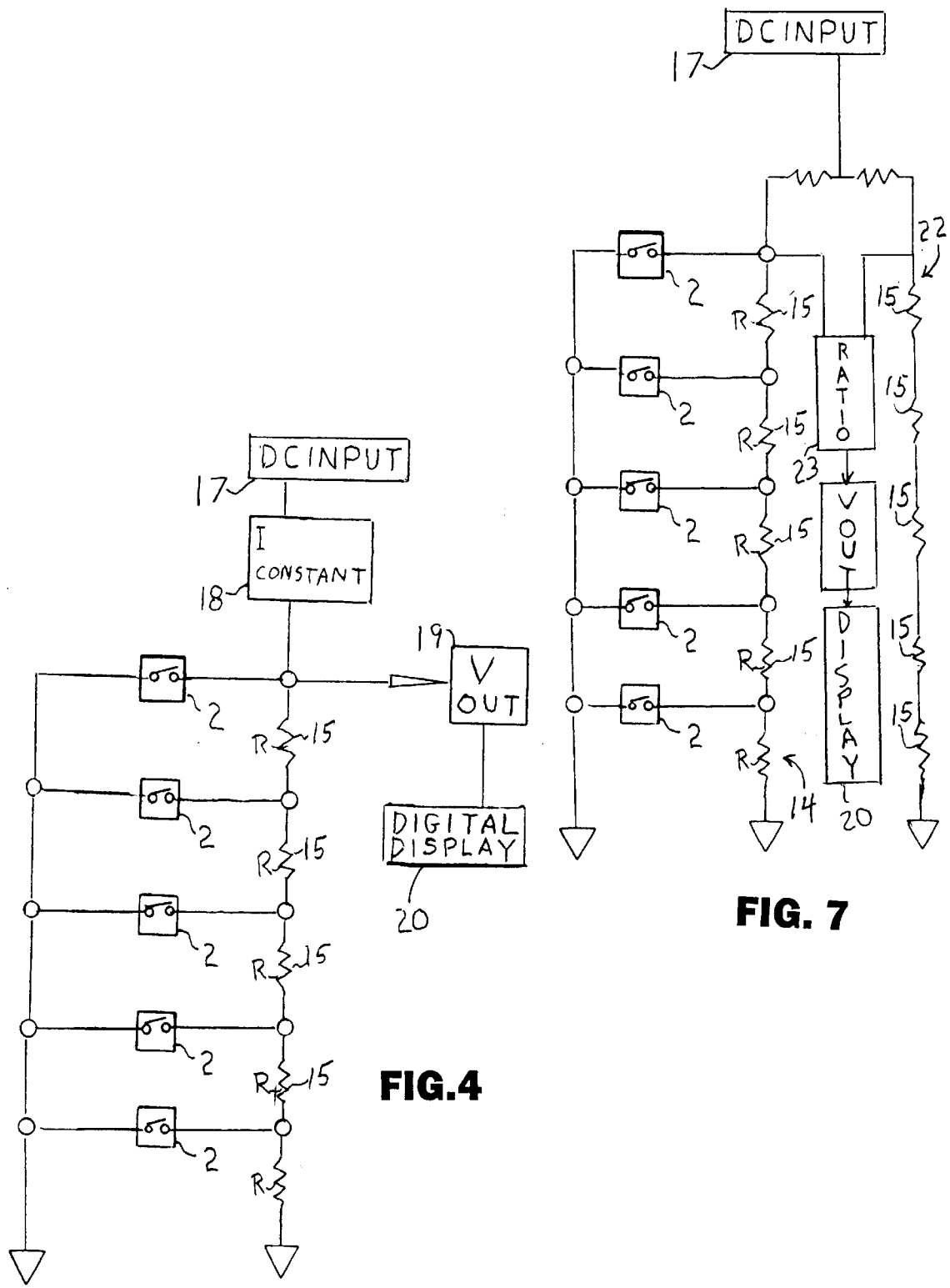
FIG. 4 is a schematic diagram of the circuit of the invention.
FIG. 7 is a schematic diagram of another embodiment of the invention.

Referring now to FIG. 7, another embodiment of the invention shows another circuit using the resistor string 14 and the switches 2. A second series string 22 of identical resistors 15 is connected in parallel to the first string 14. Both are fed directly by DC power 17. A ratio circuit 23, well known in the art, compares the voltage on the two strings and provides an output to the digital display 20 read as liquid level. The two strings are subjected to the same variations in power, noise, temperature, and the like to enhance accuracy of the reading. The above disclosed invention has a number of particular features which should preferably be employed in combination, although each is useful separately without departure from the scope of the invention. While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. In a liquid level measuring apparatus having a plurality of spaced-apart Hall-effect switches vertically arranged for positioning in a liquid for sequential actuation by a floating magnet, with electronic means for indicating liquid level based on switch actuation by the magnet, the improvement comprising:
   a) a plurality of Hall-effect switches, each switch having a single magnetic sensor, a maximum vertical dimension A, and a maximum horizontal dimension B;
   b) each switch having a center point positioned vertically by a first distance less than A from the center points of the immediately adjacent upper and lower switches;
   c) each switch having a center point positioned horizontally by a second distance at least as great as B from the center points of the immediately adjacent upper and lower switches; and
   d) a permanent magnet constructed to float in the liquid to be measured and to actuate the switches uniformly in turn as the liquid level rises.

2. The apparatus according to claim 1, in which the Hall-effect switches are supported upon a common base, said base being non-planar so as to enable the magnet to energize each of the switches in turn with substantially equal magnet force.

3. The apparatus according to claim 2, in which the base is arranged substantially cylindrically, and the magnet is configured to provide a corresponding magnetic field.

4. The apparatus according to claim 2, in which the base is arranged in the form of an elongate prism with a plurality of equal sides, and the magnet is configured to provide a corresponding magnetic field.

5. The apparatus according to claim 2, in which the base is first assembled in substantially planar configuration and then bent into a cylindrical configuration.

6. The apparatus according to claim 2, in which the base is first assembled in substantially planar configuration and then bent into a prismatic configuration.

7. The apparatus according to claim 2, further comprising:
   a) a constant current DC power source;
   b) a string of uniform resistors connected in series with the constant current power source at one end and ground at the other end;
   c) the switches arranged to selectively apply ground between each pair of resistors as each switch is actuated by the magnet; and
   d) display means connected to the power source for displaying the voltage applied by the power source in liquid level readable format.

8. The apparatus according to claim 2, further comprising:
   a) a DC power source;
   b) a first string of resistors connected in series with the power source through a first dropping resistor at one end and ground at the other end;
   c) the switches arranged to selectively apply ground between each pair of resistors as each switch is actuated by the magnet;
   d) a second string of resistors connected in series with the power source through a second dropping resistor, identical to the first dropping resistor, at one end and ground at the other end, the first and second strings being composed of uniform resistors;
   e) a ratio circuit having:
      i) a first input connected to the first string at its connection to the first dropping resistor;
      ii) a second input connected to the second string at its connection to the second dropping resistor; and
      iii) an output that is a ratio of the first and second inputs; and
   f) display means connected to the output for displaying the ratio output in liquid level readable format.

9. In a liquid level measuring apparatus having a plurality of spaced-apart Hall-effect switches vertically arranged for positioning in a liquid for sequential actuation by a floating magnet, with electronic means for indicating liquid level based on switch actuation by the magnet, the improvement comprising:
   a) a plurality of Hall-effect switches, each switch having a single magnetic sensor, a maximum vertical dimension A, and a maximum horizontal dimension B;
   b) each switch having a center point positioned vertically by a first distance less than A from the center points of the immediately adjacent upper and lower switches;
   c) each switch having a center point positioned horizontally by a second distance at least as great as B from the center points of the immediately adjacent upper and lower switches;
   d) a permanent magnet constructed to float in the liquid to be measured and to actuate the switches uniformly in turn as the liquid level rises;
   e) the Hall-effect switches being supported upon a common base said base being non-planar so as to enable the magnet to energize each of the switches in turn with substantially equal magnet force;
   f) a constant current DC power source;
   g) a string of uniform resistors connected in series with the constant current power source at one end and ground at the other end;
   h) the switches arranged to selectively apply ground between each pair of resistors as each switch is actuated by the magnet; and
   i) display means connected to the power source for displaying the voltage applied by the power source in liquid level readable format.

10. The apparatus according to claim 9, in which the base is arranged substantially cylindrically, and the magnet is configured to provide a corresponding magnetic field.

11. The apparatus according to claim 9, in which the base is arranged in the form of an elongate prism with a plurality of equal sides, and the magnet is configured to provide a corresponding magnetic field.

12. In a liquid level measuring apparatus having a plurality of spaced-apart Hall-effect switches vertically arranged for positioning in a liquid for sequential actuation by a floating magnet, with electronic means for indicating liquid level based on switch actuation by the magnet, the improvement comprising:

a) a plurality of Hall-effect switches, each switch having a maximum vertical dimension A, and a maximum horizontal dimension B;

b) each switch having a center point positioned vertically by a first distance less than A from the center points of the immediately adjacent upper and lower switches;

c) each switch having a center point positioned horizontally by a second distance at least as great as B from the center points of the immediately adjacent upper and lower switches;

d) a permanent magnet constructed to float in the liquid to be measured and to actuate the switches uniformly in turn as the liquid level rises;

e) the Hall-effect switches being supported upon a common base, said base being non-planar so as to enable the magnet to energize each of the switches in turn with substantially equal magnet force;

f) a DC power source;

g) a first string of resistors connected in series with the power source through a first dropping resistor at one end and ground at the other end;

h) the switches arranged to selectively apply ground between each pair of resistors as each switch is actuated by the magnet;

i) a second string of resistors connected in series with the power source through a second dropping resistor, identical to the first dropping resistor, at one end and ground at the other end, the first and second strings being composed of uniform resistors;

j) a ratio circuit having:

A) a first input connected to the first string at its connection to the first dropping resistor;

B) a second input connected to the second string at its connection to the second dropping resistor; and C) an output that is a ratio of the first and second inputs; and k) display means connected to the output for displaying the ratio output in liquid level readable format.

13. The apparatus according to claim 12, in which the base is arranged substantially cylindrically, and the magnet is configured to provide a corresponding magnetic field.

14. The apparatus according to claim 12, in which the base is arranged in the form of an elongate prism with a plurality of equal sides, and the magnet is configured to provide a corresponding magnetic field.

* * * * *